(12) United States Patent
Nakatani

(10) Patent No.: US 8,226,055 B2
(45) Date of Patent: Jul. 24, 2012

(54) LEG DEVICE

(75) Inventor: Koichiro Nakatani, Shinuku-Ku (JP)

(73) Assignee: Velbon Kabushiki Kaisha, Tokyo (JP)

( * ) Notice: Subject to any disclaimer, the term of this patent is extended or adjusted under 35 U.S.C. 154(b) by 715 days.

(21) Appl. No.: 12/295,684

(22) PCT Filed: Apr. 17, 2008

(86) PCT No.: PCT/JP2008/057469
§ 371 (c)(1),
(2), (4) Date: Oct. 1, 2008

(87) PCT Pub. No.: WO2009/128153
PCT Pub. Date: Oct. 22, 2009

(65) Prior Publication Data
US 2010/0230560 A1    Sep. 16, 2010

(51) Int. Cl.
*F16M 11/16* (2006.01)
(52) U.S. Cl. ............ 248/188; 248/168; 248/188.5; 248/188.6; 403/329
(58) Field of Classification Search ........... 248/188, 248/167, 168, 170, 436, 173, 188.5, 432, 248/151, 172, 188.6, 188.8, 150, 177.1, 291.1, 248/289.11; 403/329, 397, DIG. 14, 150, 403/151, 152
See application file for complete search history.

(56) References Cited

U.S. PATENT DOCUMENTS

| 3,804,033 | A | * | 4/1974 | Izawa et al. | 108/53.5 |
| 4,029,279 | A | * | 6/1977 | Nakatani | 248/188.5 |
| 4,174,900 | A | * | 11/1979 | Ina | 248/163.1 |
| 5,566,915 | A | * | 10/1996 | Hansare | 248/188.8 |
| 6,179,266 | B1 | * | 1/2001 | Hutten | 248/465 |
| 6,536,723 | B1 | * | 3/2003 | Nakatani | 248/163.1 |

FOREIGN PATENT DOCUMENTS

| CN | 1331787 A | 1/2002 |
| DE | 3148391 A1 | 6/1983 |
| JP | 52-76328 | 6/1977 |
| JP | 57-53193 U | 3/1982 |
| JP | 62-176598 | 11/1987 |
| JP | 3-69800 U | 7/1991 |
| JP | 5-52500 | 7/1993 |

(Continued)

OTHER PUBLICATIONS

International Search Report for PCT/JP2008/057469, mail date May 20, 2008.

(Continued)

*Primary Examiner* — Kimberly Wood
(74) *Attorney, Agent, or Firm* — McDermott Will & Emery LLP

(57) ABSTRACT

The leg device includes a base portion, extendable legs rotatable with respect to the base portion, and leg support members for rotatably supporting the extendable legs, wherein the extendable leg includes the first tubular member having a fitting hole portion formed in the vicinity of the upper end thereof. The second tubular member that is adjustable with respect to its protruding length from the lower end of the first tubular member is inserted into the first tubular member. The leg support member includes a pivot portion rotatably fitted in the fitting hole portion. In a state where the extendable leg is contracted, the upper end of the second tubular member is positioned upward of the pivot portion.

4 Claims, 5 Drawing Sheets

FOREIGN PATENT DOCUMENTS

| | | |
|---|---|---|
| JP | 2001-065785 A | 3/2001 |
| JP | 2001-065786 | 3/2001 |
| JP | 2006-146114 A | 6/2006 |
| JP | 2007-518124 A | 7/2007 |
| TW | I 234629 B | 6/2005 |
| TW | 200607952 A | 3/2006 |
| WO | 02/06721 A1 | 1/2002 |
| WO | 2005/068895 A1 | 7/2005 |

OTHER PUBLICATIONS

International Search Report (ISR) for PCT/JP2008/057469, mail date May 20, 2008.

* cited by examiner

LEG DEVICE

CROSS REFERENCE TO PRIOR RELATED APPLICATIONS

This is a U.S. national phase application under 35 U.S.C. §371 of International Patent Application No. PCT/JP2008/057469 filed Apr. 17, 2008, the contents of which are incorporated herein in its entirety. The International Application has not been published at the time of this filing.

TECHNICAL FIELD

The present invention relates to a leg device capable of securing a required height in use and becoming sufficiently compact in non-use.

BACKGROUND OF THE INVENTION

Conventionally, a leg device such as a tripod, etc., which is described in FIG. 7 and FIG. 8 of Japanese Laid-Open Patent Publication No. 2001-65786 (FIG. 7 and FIG. 8), has been known.

A related art leg device includes a base portion, extendable legs that are able to rotate with respect to the base portion, and support shafts for coupling the base portion with the extendable legs. The extendable leg includes the first tubular member having an insertion hole portion into which a support shaft is inserted and the second tubular member movably inserted into the first tubular member, which is adjustable with respect to its protruding length from the lower end of the first tubular member in line with its movement relative to the first tubular member. And, in a state where the extendable leg is contracted, the upper end of the second tubular member is brought into contact with the support shaft and is positioned downward of the support shaft.

However, in such a structure that, in a state where the extendable leg is contracted, the upper end of the second tubular member is brought into contact with the support shaft and is positioned downward of the support shaft as in the related art described above, since the expansion ratio of the extendable leg is small, a required height cannot be secured if compactness is pursued in non-use, for example, when carrying the same. On the contrary, if the height is pursued in use, there may be a fear that the compactness becomes insufficient in non-use.

The invention has been developed with this point in mind, and it is therefore an object of the invention to provide a leg device capable of securing a required height in use and becoming sufficiently compact in non-use.

SUMMARY OF THE INVENTION

A leg device according to the invention includes a base portion, extendable legs rotatable with respect to the base portion, and leg support members for rotatably supporting the extendable legs, which are disposed between the base portion and the extendable legs, wherein the extendable leg includes the first tubular member having a fitting hole portion formed in the vicinity of the upper end thereof and the second tubular member that is movably inserted into the first tubular member and is adjustable with respect to its protruding length from the lower end of the first tubular member in line with its movement relative to the first tubular member, and the leg support member includes a pivot portion rotatably fitted in the fitting hole portion of the first tubular member, and in a state where the extendable leg is contracted, the upper end of the second tubular member is positioned upward of the pivot portion.

A leg device is featured, in that the leg support member includes a main body plate portion placed and held between the inner surface of the base portion and the outer surface of the first tubular member, a circular plate portion protruding on one side of the main body plate portion, which composes the pivot portion, and a fall-out stopping catch protruding on the other side of the main body plate portion, which is engaged with the base portion.

A leg device of the invention is featured, in that the main body plate portion is composed of a first plate having a notch formed to permit deformation and a second plate secured on the first plate, which is resiliently deformable into the deformation-permitting notch, wherein the circular plate is provided to protrude on the first plate, and the fall-out stopping catch is provided to protrude on the second plate.

A leg devicer, in addition to the above, in that in a state where the extendable leg is contracted, the upper end of the second tubular member is positioned roughly on the same level as the upper end of the first tubular member at a position upward of the pivot portion.

According to an aspect of the invention, since the upper end of the second tubular member is positioned upward the pivot portion in a state where the extendable leg is contracted, the expansion ratio of the extendable leg can be improved, wherein a required height can be secured in use, and sufficient compactness is secured in non-use.

According to another aspect of the invention, since the leg support member includes a main body plate portion placed and held between the inner surface of the base portion and the outer surface of the first tubular member, a circular plate portion protruding on one side of the main body plate portion, which composes the pivot portion, and a fall-out stopping catch protruding on the other side of the main body plate portion, which is engaged with the base portion, the leg support member can appropriately support the extendable leg.

According to the invention, since the second plate of the main body plate portion of the leg support member is resiliently deformed into the deformation-permitting notch of the first plate, work of attaching the extendable leg to the base portion can be facilitated.

According to a further aspect of the invention, since, in a state where the extendable leg is contracted, the upper end of the second tubular member is positioned roughly on the same level as the upper end of the first tubular member at a position upward of the pivot portion, it is possible to appropriately improve the expansion ratio of the extendable leg.

DETAILED DESCRIPTION OF THE INVENTION

A description is given of an embodiment of a leg device according to the invention with reference to the drawings.

Figure 1:
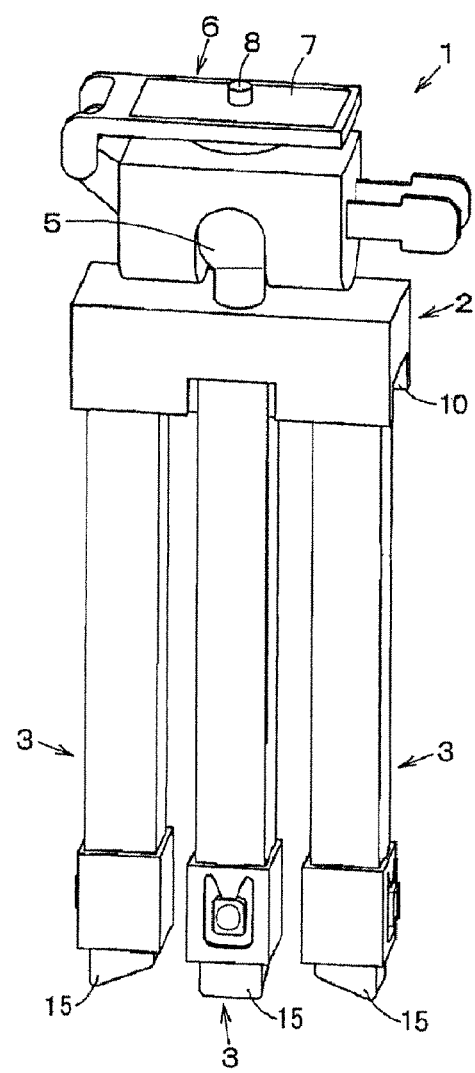
FIG. 1 is a perspective view showing a leg device according an embodiment of the invention.

In FIG. 1, reference numeral 1 denotes a leg device. The leg device 1 is a tripod having a panhead, which supports an object (not illustrated) such as, for example, a camera, a video camera, etc.

The leg device 1 is provided with a base portion 2 the outer shape of which is a roughly rectangular parallelepiped. The upper end sides of a plurality of, for example, three long extendable legs 3, which are extendable and contractible in the lengthwise direction, are attached to the underside of the base portion 2 so as to be rotatable. A roughly spherical panhead retainer 5 is provided so as to protrude on the upper surface of the base portion 2. A panhead 6 is mounted on the panhead retainer 5 so as to be rotatable in all directions. The panhead 6 has a support plate portion 7 for supporting an object, and a screw 8 that is screwed in a screwed hole in the underside of the object protrudes upward from the upper surface of the support plate portion 7.

Figure 2:
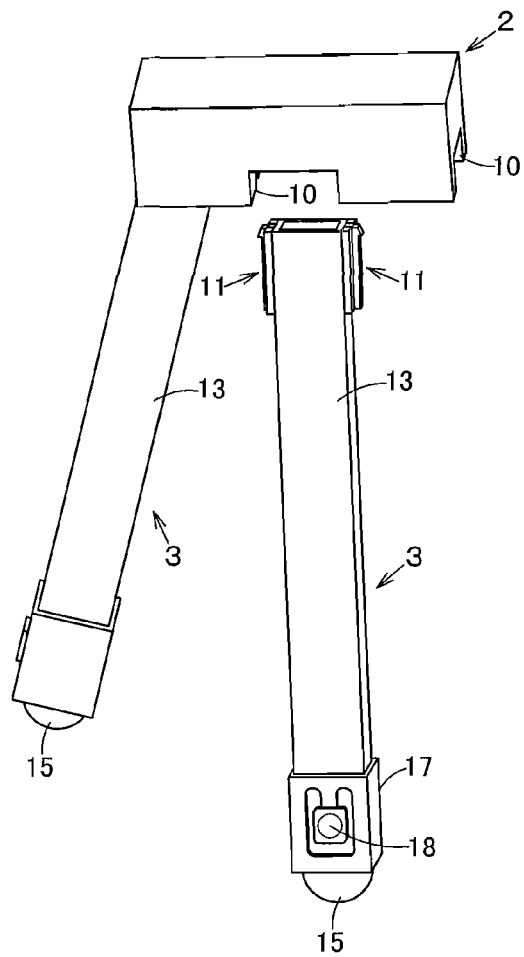
FIG. 2 is a partially disassembled perspective view of the same leg device.
Figure 3:
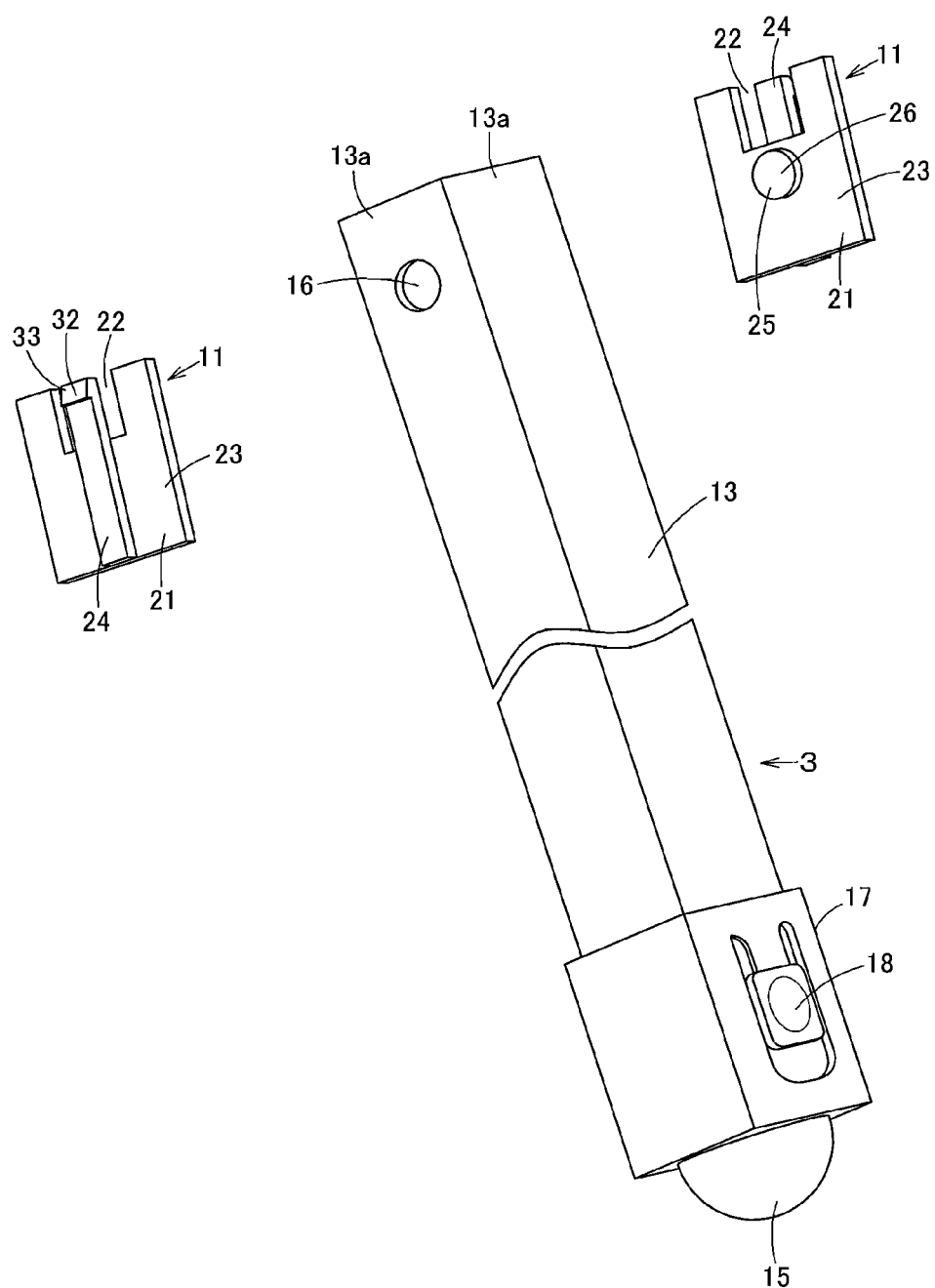
FIG. 3 is a perspective view showing an extendable leg and a leg support member of the same leg device.
Figure 4:
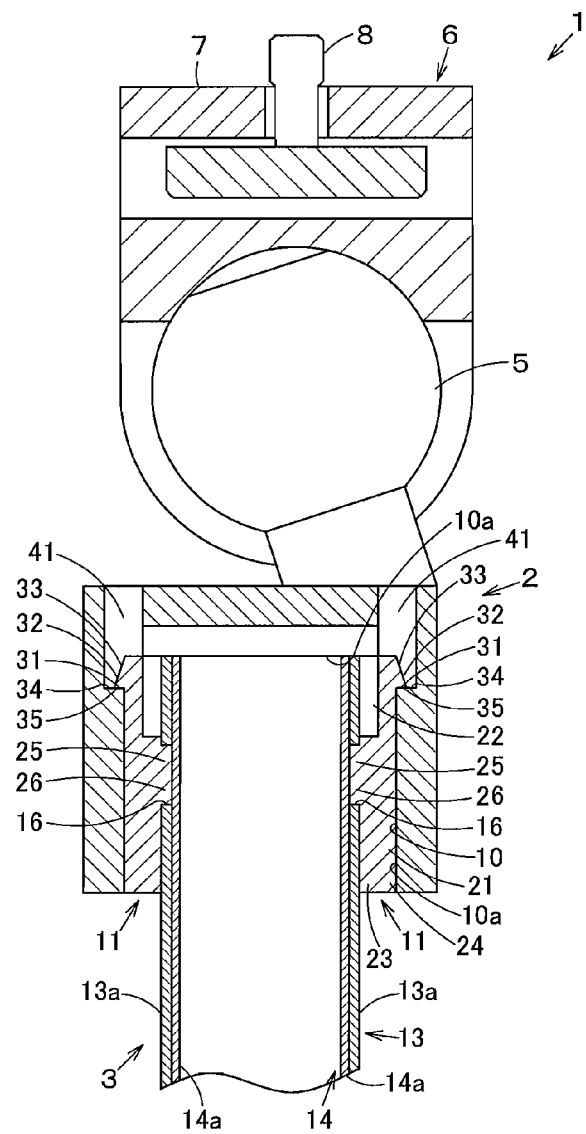
FIG. 4 is a sectional view showing the major parts of the same leg device.

Also, the base portion 2 has a plurality of, for example, three leg attaching recesses 10 being leg attaching portions, which are concave and open downward. And, as shown in FIG. 2 through FIG. 4, in the respective leg attaching recesses 10, the upper end part of the extendable leg 3 is mounted via a plurality of, for example, two roughly plate-shaped leg support members 11 so as to be rotatable in a state where the upper end part thereof is inserted in the leg attaching recess 10 and prevented from falling-out. That is, the upper end part of the extendable leg 3 and two leg support members 11 are fitted in the respective attaching recesses 10, and the upper end part of the extendable leg is supported by the two leg support members 11 so as to be rotatable. The respective leg support members 11 are fitted and disposed between the leg attaching recess 10 of the base portion 2 and the upper end part of the extendable leg 3 in a state where the leg support members 11 are placed and held between the base portion 2 and the extendable leg 3.

Each of the three extendable legs 3 has the same structure, and the respective extendable legs 3 are composed of a plurality of square tubular members, for example, ten tubular members and are of a plurality of stages, for example, ten stages. The respective extendable legs 3 have the first tubular member 13 being the uppermost tubular member and the second tubular member 14 being the second stage from above, etc., and a butt end 15 is attached to the lower end part of the lowermost tubular member.

The first tubular member 13 is square-tubular, in which the upper and lower end sides being both end sides in the axial direction are open. Two fitting hole portions 16, which are circular through-holes faced to and apart from each other, are formed in the vicinity of the upper end of the first tubular member 13. That is, the first tubular member 13 is composed of four rectangular plates 13a, and a fitting hole portion 16 is passed through the rectangular plates 13a and formed to be through in the vicinity of the upper ends of two opposed rectangular plates apart from each other.

The second tubular member 14 is square-tubular, whose upper and lower end sides being both end sides in the axial direction are open as in the first tubular member 13. The length dimension in the axial direction is almost the same as that of the first tubular member 13, and the width dimension is smaller than that of the first tubular member 13. The second tubular member 14 is movably fitted and inserted into the first tubular member 13 in the up and down direction that is the axial direction with respect to the first tubular member 13.

And, the second tubular member 14 is adjustable in terms of the protruding length thereof from the lower end of the first tubular member 13 in line with movement thereof with respect to the first tubular member 13. Also, the second tubular member 14 is composed of four rectangular plates 14a, and the thickness dimension of the rectangular plate 14a is roughly the same as that of the rectangular plate 13a of the first tubular member 13.

In addition, the extendable leg 3 has locking means (not illustrated) composed of a regulating member, etc., for regulating movements of the second tubular member 14 with respect to the first tubular member 13. And, if the extendable leg 3 is brought into an extended state by maximizing the protruding length of the second tubular member 14 from the lower end of the first tubular member 13, and maximizing the protruding length of nine tubular members subsequent to the second stage, the extendable leg 3 which is in an extended state is locked in the extended state by the locking means. Where restoring the extendable leg 3 to a contracted state, the operating portion 18 of the lock-canceling means 17 attached to the outer circumference of the lower end part of the first tubular member 13 is operated and pushed, and the second tubular member 14 is accommodated in the first tubular member 13, and the nine tubular members subsequent to the second stage are accommodated in the first tubular member 13.

Three pairs of leg support members 11 (six leg support members in total) are of the same shape, and the respective leg support members 11 have a main body plate portion 21 positioned in the leg attaching recess 10 and placed and held between the inner surface 10b of the leg attaching recess 10 of the base portion 2 and the outer surface of the rectangular plate 13a of the first tubular member 13 along the perpendicular surface.

The main body plate portion 21 is composed of the roughly channel-shaped first plate 23 in which a deformation-permitting notch 22 being a square space portion is notched and formed from the upper end roughly to the middle in the up and down direction, and the second plate 24 lengthwise in the up and down direction, which is provided to be integral at the middle in the horizontal direction at one side of the first plate 23 and the upper end side of the main body plate portion 21 is resiliently deformable to be like a curved surface toward the deformation-permitting notch 22. The length dimension of the first plate 23 in the horizontal direction is almost the same as the width dimension of the rectangular plate 13a of the first tubular member 13.

At one side of the main body plate portion 21, that is, roughly at the middle part of the side at the first tubular member 13 side of the first plate 23 of the main body plate portion 21, a circular plate portion 26 that is formed to be like a circular plate whose thickness is almost the same as that of the first tubular member 13 and composes a pivot portion 25 to rotatably support the first tubular member 13 is integrally protruded. The circular plate-like pivot portion 25 is rotatably fitted in the fitting hole portion 16 of the first tubular member 13 and is disposed in the fitting hole portion 16. That is, the tip end side of the pivot portion 25 protruding from the main body plate portion 21 is positioned almost on the same level as the inner side of the first tubular member 13 and does not protrude further inwardly of the inner side of the first tubular member 13. The thickness dimension of the circular plate portion 26 being the pivot portion 25 is roughly the same as the thickness dimension of the rectangular plate 13a of the first tubular member 13.

At the other side of the main body plate portion 21, that is, at the upper end part at the opposite side of the first tubular member 13 side of the second plate 24 of the main body plate portion 21, a claw-shaped fall-out stopping catch 32 is integrally provided to protrude therefrom, which prevents the leg support member 11 from falling out downward from the inside of the leg attaching recess 10 by engagement with a catch receiving stage portion 31 being a catch receiver formed in the leg attaching recess 10 of the base portion. The fall-out stopping catch 32 is inclined with respect to the perpendicular direction and has a guide inclined plane 33 positioned to the first tubular member 13 side toward the upper end thereof. In addition, the fall-out stopping catch 32 has an engagement plane 35 planarly brought into contact with a horizontal plane-like receiving plane 34 of the catch receiving stage portion 31.

And, as shown in FIG. 4, the leg device 1 is positioned roughly on the same level as the upper end of the first tubular member 13 at a position where the upper end of the second tubular member 14 is upward of the pivot portion 25 when the extendable leg 3 is contracted to the maximum. That is, for example, in a state shown in FIG. 4, the upper end of the first tubular member 13, the upper end of the second tubular member 14 and the upper end of the leg support member 11 are brought into contact with and are positioned on the same level as the fitting side 10a of the leg attaching recess 10. Further, a hole portion 41 facing the catch receiving stage portion 31 is formed at the base portion 2, and the hole portion 41 communicates with the inside of the leg attaching recess 10 and is open upward.

Next, a description is given of operations, etc., of the leg device 1.

Where the extendable leg 3 is attached to the leg attaching recess 10 of the base portion 2, two leg support members 11 are first attached to the outer side of the upper end part of the first tubular member 13 of the extendable leg 3. That is, the pivot portion 25 of the leg support member 11 is fitted in the fitting hole portion 16 of the first tubular member 13, wherein the pivot portion 25 and the fitting hole portion 16 are fitted to each other.

Next, the upper end part of the first tubular member 13 to which two leg support members 11 are attached is inserted into the leg attaching recess 10 of the base portion 2 along with these two leg support members 11, wherein the fall-out stopping catch 32 of the leg support member 11 and the catch receiving stage portion 31 of the leg attaching recess 10 of the base portion 2 are engaged with each other, and the upper end part of the first tubular member 13 is prevented from falling out from the leg attaching recess 10 of the base portion 2.

Figure 5:
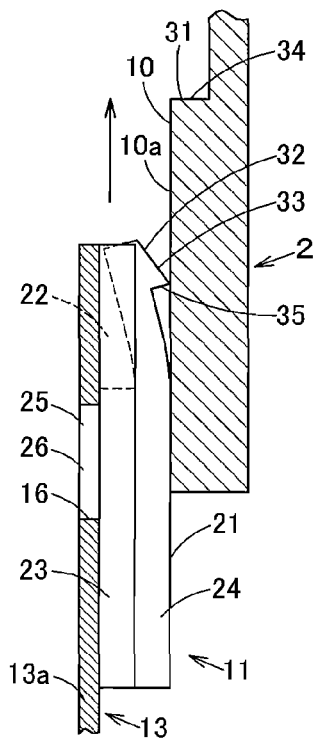
FIG. 5 is a view showing a state where a part of the leg support member is resiliently deformed when attaching the extendable leg to the base portion.

When inserting the upper end part of the first tubular member 13 into the leg attaching recess 10, as shown in FIG. 5, since the upper end side of the second plate 24 of the leg support member 11 is pressed by the perpendicular plane-shaped inner side 10b of the leg attaching recess 10, the upper end side thereof is bent to be like a curvature toward the inside of the deformation-permitting notch 22 and is resiliently deformed. After that, as the upper end side of the second plate 24 of the leg support member 11 reaches the position of the catch receiving stage portion 31 of the leg attaching recess 10, it is separated from the perpendicular plate-shaped inner side 10b of the leg attaching recess 10, and is restored to its original state based on a resilient restoration force. Resultantly, the fall-out stopping catch 32 and the catch receiving stage portion 31 are engaged with each other, and the leg support member 11 and the upper end part of the first tubular member 13 are prevented from falling out from the inside of the leg attaching recess 10 by the engagement.

The extendable leg 3 thus attached to the leg attaching recess 10 by the leg support member 11 is rotatable centering around the pivot portion 25 of the leg support member 11.

Where an object such as a camera is supported by using the leg device 1, the three extendable legs 3 are brought from a contracted state into an extended state after the extendable legs 3 are rotated in the opening direction centering around the pivot portions 25, and thereafter, an object is attached to the panhead 6.

Also, where the leg device 1 is carried, for example, after use, the object such as a camera is removed from the panhead 6, and the extendable legs 3 are returned from an extended state to a contracted state. After that, the three extendable legs 3 are rotated in the closing direction centering around the pivot portion 25 and are brought into a state shown in FIG. 1. In the state shown in FIG. 1, the three extendable legs 3 are positioned so as to be juxtaposed in the lengthwise direction of the base portion 2.

And, according to the leg device 1, since, in an extremely contracted state of the extendable legs 3, at least the upper end of the second tubular member (the lower stage tubular member) 14 is positioned roughly on the same level as the upper end of the first tubular member (the upper stage tubular member) 13 at a position upward of the pivot portion 25 of the leg support member 11, the expansion ratio of the extendable legs 3 can be appropriately improved, wherein a height required for shooting by a camera, etc., in use can be secured, and sufficient compactness can be brought into non-use, for example, when carrying it.

In addition, since not only can the extendable legs 3 be rotatably and appropriately supported by the leg support members 11 of a simple structure but also the upper end side of the second plate 24 of the main body plate portion 21 of the leg support member 11 is resiliently deformed toward the inside of the deformation-permitting notch 22 of the first plate 23, it is possible to attach the extendable legs 3 to the leg attaching recess 10 of the base portion 2 by means of the leg support member 11 with a single operation, wherein work for attaching the extendable legs 3 to the base portion 2 can be facilitated, and assembling efficiency is favorable.

Also, the extendable leg 3 is not limited to a ten-stage type. Any type may be acceptable if the type has at least two tubular members (the first tubular member 13 and the second tubular member 14).

Further, such a structure may be acceptable, which the extendable leg 3 has, for example, three or more tubular members and the respective upper ends of these three or more tubular members are positioned roughly on the same level at a position upward of the pivot portion 25 where the extendable legs are in a contracted state.

In addition, the extendable leg 3 is not limited to such a structure that it is rotatably supported by two leg support members 11. For example, such a structure may be acceptable, which the extendable leg 3 is rotatably supported only by a single leg support member 11.

Further, the leg device 1 is not limited to a tripod having a panhead, which is provided with three extendable legs 3, wherein a tripod not having any panhead may be acceptable, the number of the extendable legs 3 may be optional, that is, one, two or four or more may be acceptable.

The present invention may be utilized for a tripod for supporting, for example, a camera, etc.

The invention claimed is:

1. A leg device comprising:
    a base portion;
    extendable legs rotatable with respect to the base portion; and
    leg support members for rotatably supporting the extendable legs, which are disposed between the base portion and the extendable legs;

wherein the extendable legs includes
a first tubular member having a fitting hole portion formed in the vicinity of the upper end thereof and
a second tubular member that is adjustable with respect to its protruding length from the lower end of the first tubular member in line with its movement relative to the first tubular member, and
the leg support member includes a pivot portion rotatably fitted in the fitting hole portion of the first tubular member, and
wherein a state where the extendable legs are contracted, the upper end of the second tubular member is positioned upward of the pivot portion.

2. The leg device according to claim 1, wherein the leg support members include:
a main body plate portion placed and held between the inner surface of the base portion and the outer surface of the first tubular member;
a circular plate portion protruding on one side of the main body plate portion, which composes the pivot portion; and
a fall-out stopping catch protruding on the other side of the main body plate portion, which is engaged with the base portion.

3. The leg device according to claim 2, wherein the main body plate portion is comprised of:
a first plate having a notch formed to permit deformation; and
a second plate secured on the first plate, which is resiliently deformable into the deformation-permitting notch;
wherein the circular plate is provided to protrude on the first plate, and the fall-out stopping catch is provided to protrude on the second plate.

4. The leg device according to claim 1, wherein, in a state where the extendable legs are contracted, the upper end of the second tubular member is positioned roughly on the same level as the upper end of the first tubular member at a position upward of the pivot portion.

* * * * *